(12) United States Patent
Miyata et al.

(10) Patent No.: US 12,372,089 B2
(45) Date of Patent: Jul. 29, 2025

(54) ELECTRIC COMPRESSOR

(71) Applicant: KABUSHIKI KAISHA TOYOTA JIDOSHOKKI, Kariya (JP)

(72) Inventors: Tomoaki Miyata, Kariya (JP); Taku Adaniya, Kariya (JP); Shozo Hamana, Kariya (JP); Shuji Takimoto, Kariya (JP); Keisuke Isobe, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/768,627

(22) Filed: Jul. 10, 2024

(65) Prior Publication Data

US 2025/0020123 A1    Jan. 16, 2025

(30) Foreign Application Priority Data

Jul. 14, 2023    (JP) .................................. 2023-116029

(51) Int. Cl.
*F04C 23/02*    (2006.01)
*F04C 18/02*    (2006.01)
(Continued)

(52) U.S. Cl.
CPC .......... *F04C 23/02* (2013.01); *F04C 18/0215* (2013.01); *F04C 23/008* (2013.01);
(Continued)

(58) Field of Classification Search
CPC .... F04C 23/008; F04C 23/02; F04C 18/0215; F04C 2240/30; F04C 2240/40; F04C 2240/403; F04C 2240/803; F04C 2240/808; F04C 29/0085; F04C 29/045; H02K 3/00; H02K 3/38; H02K 3/44; H02K 3/46;
(Continued)

(56) References Cited

U.S. PATENT DOCUMENTS 10,680,482 B2 * 6/2020 Okamoto ................. H02K 3/28
10,707,715 B2 * 7/2020 Hamana ................. H02K 3/345
(Continued)

FOREIGN PATENT DOCUMENTS

| JP | 2019528665 A | 10/2019 |
|----|---|---|
| JP | 2019205341 A | 11/2019 |
| JP | 2020129944 A | 8/2020 |

*Primary Examiner* — Loren C Edwards
(74) *Attorney, Agent, or Firm* — Sughrue Mion, PLLC (57) ABSTRACT

An electric compressor includes a rotary shaft, a compression part, a motor including a stator, and a housing. The stator includes a stator core, coils corresponding to a plurality of phases, an insulator, coil ends, first leads of the winding wires, a neutral connection portion, and a cover member. The cover member has a cover end surface opposite from the coil ends. The cover end surface has an accommodation portion in which the neutral connection portion is accommodated. The first leads each include a covered portion, and a non-covered portion. The non-covered portion includes an extension portion continuous with the neutral connection portion extending out from the accommodation portion by a predetermined length. The cover end surface includes a first surface, and a second surface. At least the first surface has a through hole. The first surface is positioned farther from the coil ends than the second surface is.

5 Claims, 6 Drawing Sheets

AXIAL DIRECTION OF ROTARY SHAFT 15

(51) Int. Cl.
    *F04C 23/00*     (2006.01)
    *F04C 29/00*     (2006.01)
    *F04C 29/04*     (2006.01)
    *H02K 3/38*     (2006.01)

(52) U.S. Cl.
    CPC ........ *F04C 29/0085* (2013.01); *F04C 29/045* (2013.01); *H02K 3/38* (2013.01); *F04C 2240/30* (2013.01); *F04C 2240/40* (2013.01); *F04C 2240/403* (2013.01); *F04C 2240/803* (2013.01); *F04C 2240/808* (2013.01)

(58) Field of Classification Search
    CPC .. H02K 3/50; H02K 5/00; H02K 5/04; H02K 5/08; H02K 5/22; H02K 5/225; H02K 9/00
    See application file for complete search history.

(56) References Cited

U.S. PATENT DOCUMENTS

| | | | |
|---|---|---|---|
| 11,258,326 B2* | 2/2022 | Guntermann | H02K 3/46 |
| 11,437,882 B2* | 9/2022 | Takimoto | H02K 11/33 |
| 2019/0203715 A1 | 7/2019 | Heo et al. | |
| 2019/0363607 A1* | 11/2019 | Guntermann | F04B 39/121 |

* cited by examiner

AXIAL DIRECTION OF ROTARY SHAFT 15

ELECTRIC COMPRESSOR

CROSS-REFERENCE TO RELATED APPLICATION

This application claims priority to Japanese Patent Application No. 2023-116029 filed on Jul. 14, 2023, the entire disclosure of which is incorporated herein by reference.

The present disclosure relates to an electric compressor.

BACKGROUND ART

The electric compressor includes a rotary shaft, a compression part, a motor, and a housing. The compression part compresses fluid with rotation of the rotary shaft. The motor rotates the rotary shaft. The housing has a motor chamber. The motor chamber accommodates the motor. Fluid is introduced into the motor chamber.

The motor includes a stator. The stator includes a stator core, coils corresponding to a plurality of phases, and an insulator. The stator core is fixed to the housing. The coils corresponding to the plurality of phases are formed by concentrated winding of the winding wires corresponding to the plurality of phases on the stator core. The insulator is disposed relative to a core end surface of the stator core positioned at one end thereof in an axial direction of the rotary shaft. The insulator provides electrical insulation between the coils and the core end surface.

The motor includes coil ends, leads, and a neutral connection portion. The coil ends are portions of the coils corresponding to the plurality of phases, and project out from the core end surface. The leads are portions of the winding wires corresponding to the plurality of phases, and drawn out from the coil ends corresponding to the plurality of phases. Ends of the leads corresponding to the plurality of phases are electrically connected at the neutral connection portion to form a neutral point.

For example, the neutral connection portion is fixed to the coil ends by tying the neutral connection portion to the coil ends with a fixing thread. However, in this case, a process of tying the neutral connection portion to the coil ends with a fixed thread is required. This is not desirable, as the work process becomes complicated.

For example, Japanese Patent Application Publication No. 2020-129944 discloses an electric compressor including an accommodation member in which the neutral connection portion is accommodated. Since this allows the process of tying the neutral connection portion to the coil ends with the fixing thread to be omitted, the working process is simplified.

In such an electric compressor, the stator may include a cover member having electrical insulation properties disposed relative to the coil ends on a side opposite from the core end surface in the axial direction of the rotary shaft. The cover member has a cover end surface opposite from the coil ends in the axial direction of the rotary shaft. The cover end surface has an accommodation portion that has electrical insulation properties and in which the neutral connection portion is accommodated. This allows the electric compressor to be downsized in the radial direction of the rotary shaft, for example, as compared to a case in which the accommodation portion that accommodates the neutral connection portion is provided on the outer peripheral side of the insulator.

The winding wires each include a conductor wire and a coating applied to the outer periphery of the conductor wire. In order to secure electrical insulation of the leads corresponding to the plurality of phases, for example, the outer periphery of each of the coatings of the winding wires is covered with an insulation member having a tubular shape and made of a resin material. Therefore, the leads corresponding to the plurality of phases each have a covered portion in which the outer periphery of the coating is covered with the insulation member.

In addition, as mentioned above, when the neutral connection portion is accommodated in the accommodation portion having electrical insulation properties, for example, it may be considered that resin is poured into an inside of the accommodation portion and hardened to seal the inside of the accommodation portion in order to secure the insulation of the neutral connection portion. At this time, for example, if a portion of each of the leads corresponding to the plurality of phases, which is accommodated in the accommodation portion, is covered with the insulation member, the resin poured into the accommodation portion may have difficulty sticking to the insulation member, which may make sealing the inside of the accommodation portion with the resin difficult. Therefore, no insulation member is provided in a portion of each of the leads corresponding to the plurality of phases, which includes a neutral connection portion and is positioned in the accommodation portion. Furthermore, in consideration with an errors in design of a dimension of the accommodation portion, the insulation member may not be provided in a portion of each of the leads corresponding to the plurality of phases, which extends out from the accommodation portion by a predetermined length. Accordingly, the leads corresponding to the plurality of phases each may include a non-covered portion to which the insulation member is not provided, and that has an extension portion continuous with the neutral connection portion and extending out from the accommodation portion by the predetermined length. According to this, even if there is an error in design of the dimension of the accommodation portion, the portion of each of the leads corresponding to the plurality of phases, which is positioned in the accommodation portion, may be reliably inserted as the non-covered portion where no insulation member is provided. As a result, the inside of the accommodation portion may be reliably sealed with the resin.

Since the coils generate heat, it is desired to cool the coils with fluid in the motor chamber. However, when the cover member is disposed relative to the coil end on a side opposite from the end surface of the stator core in the axial direction of the rotary shaft, the cover member may prevent a flow of the fluid introduced into the motor chamber to the coil ends. Therefore, for example, forming a through hole in the cover end surface may be considered. This allows fluid introduced into the motor chamber to flow to the coil ends through the through hole, so that the coils may be efficiently cooled by the fluid.

However, the through hole may be formed at least in a first surface of the cover end surface on which the accommodation portion and the extension portions of the leads corresponding to the plurality of phases are placed. In this case, since the extension portions of the leads are not provided with the insulation members, poor insulation between the extension portions and the coil ends through the through hole may occur. Thus, in order to secure the insulation distance between the extension portions and the coil ends through the through hole, the cover end surface may be spaced from the coil ends as far as possible. However, as the cover end surface is spaced from the coil ends, the size of the electric compressor in the axial direction of the rotary shaft may increase. Therefore, there is a need for an electric compressor in which insulation between the leads corresponding to the plurality of phases and the coil ends can be secured while reducing the size of the electric compressor in the axial direction of the rotary shaft, and the coils can be cooled.

SUMMARY

In accordance with an aspect of the present disclosure, there is provided an electric compressor including a rotary shaft, a compression part configured to compress fluid with rotation of the rotary shaft, a motor configured to rotate the rotary shaft, a housing having a motor chamber in which the motor is accommodated and into which the fluid is introduced. The motor including a stator. The stator includes a stator core fixed to the housing, coils corresponding to a plurality of phases, the coils being formed by concentrated winding of winding wires corresponding to the plurality of phases on the stator core, an insulator disposed relative to a core end surface of the stator core in an axial direction of the rotary shaft, and providing insulation between the coils and the core end surface, coil ends of the coils corresponding to the plurality of phases, the coil ends projecting out from the core end surface, first leads being portions of the winding wires corresponding to the plurality of phases and drawn out from the coil ends corresponding to the plurality of phases, respectively, a neutral connection portion in which ends of the first leads corresponding to the plurality of phases are electrically connected to form a neutral point, and a cover member having electrical insulation properties and disposed on a side of the coil ends opposite from the core end surface in the axial direction. The winding wires each has a conductor wire and a coating provided on an outer periphery of the conductor wire. The cover member has a cover end surface opposite from the coil ends in the axial direction. The cover end surface having an accommodation portion in which the neutral connection portion is accommodated, the accommodation portion having electrical insulation properties. The first leads corresponding to the plurality of phases each include a covered portion in which an outer periphery of the coating is covered with an insulation member, and a non-covered portion which is not provided with the insulation member and includes the neutral connection portion and an extension portion continuous with the neutral connection portion extending out from the accommodation portion by a predetermined length. The cover end surface includes a first surface on which the accommodation portion and the extension portion are placed, and a second surface that is a surface different from the first surface, at least the first surface having a through hole through which the fluid introduced into the motor chamber flows to the coil end. The first surface is positioned farther from the coil ends than the second surface is.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of an electric compressor with reference to FIGS. 1 to 8. The electric compressor of the present embodiment is used, for example, for a vehicle air conditioner.

Basic Configuration of Electric Compressor

Figure 1:
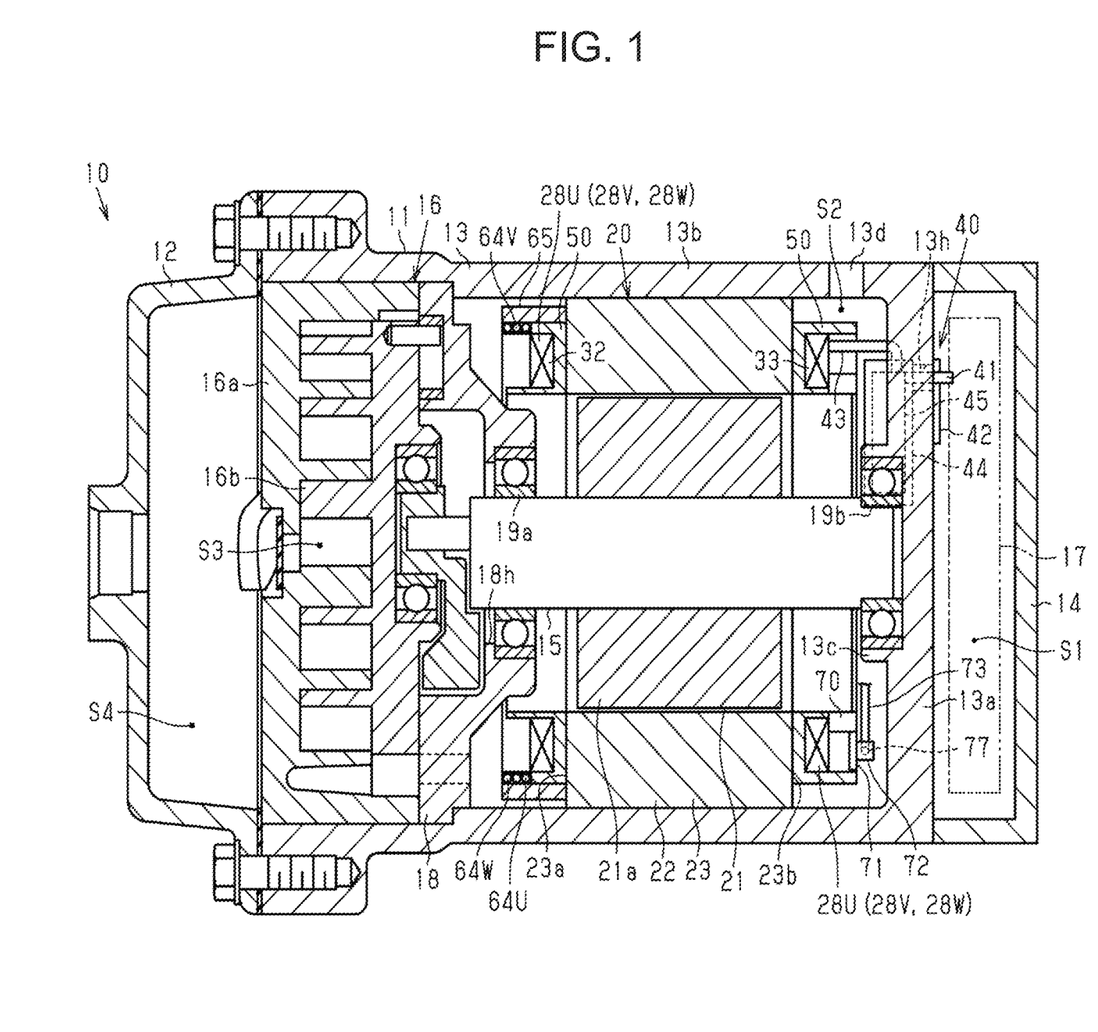
FIG. 1 is a cross-sectional view of an electric compressor according to an embodiment of the present disclosure.

As illustrated in FIG. 1, an electric compressor 10 includes a housing 11 having a tubular shape. The housing 11 includes a discharge housing 12, a motor housing 13, and an inverter case 14. The discharge housing 12, the motor housing 13, and the inverter case 14 are made of a metal material. The discharge housing 12, the motor housing 13, and the inverter case 14 are made of aluminum, for example.

The motor housing 13 includes an end wall 13a and a peripheral wall 13b. The end wall 13a has a plate shape. The peripheral wall 13b has a tubular shape and extends from an outer periphery of the end wall 13a. The discharge housing 12 has a tubular shape. The discharge housing 12 is connected to an end of the peripheral wall 13b of the motor housing 13 opposite from the end wall 13a. The inverter case 14 has a tubular shape. The inverter case 14 is connected to the end wall 13a of the motor housing 13. The end wall 13a of the motor housing 13 and the inverter case 14 cooperate to define an inverter chamber S1.

The motor housing 13 has a boss 13c. The boss 13c has a cylindrical shape. The boss 13c protrudes from a central portion of an end surface of the end wall 13a of the motor housing 13 on a side of the peripheral wall 13b. An axis of the boss 13c coincides with an axis of the peripheral wall 13b of the motor housing 13. The end wall 13a of the motor housing 13 has a hole 13h. The hole 13h extends through the end wall 13a of the motor housing 13 in the thickness direction of the end wall 13a. The hole 13h is positioned closer to the peripheral wall 13b than the boss 13c is.

The motor housing 13 has an inlet port 13d. The inlet port 13d is formed in a portion of the peripheral wall 13b of the motor housing 13 close to the end wall 13a. The inlet port 13d provides communication between and an outside and an inside of the motor housing 13. Refrigerant, which corresponds to fluid, is introduced into the motor housing 13 through the inlet port 13d from the outside of the motor housing 13.

The electric compressor 10 includes a rotary shaft 15, a compression part 16, an inverter 17, and a motor 20. The rotary shaft 15, the compression part 16, and the motor 20 are accommodated in the motor housing 13. That is, the housing 11 accommodates the motor 20. The rotary shaft 15 is disposed in the motor housing 13 with an axis of the rotary shaft 15 coinciding with the axis of the peripheral wall 13b of the motor housing 13. The inverter 17 is accommodated in the inverter chamber S1.

The compression part 16 and the motor 20 are arranged side by side in an axial direction of the rotary shaft 15 in which the axis of the rotary shaft 15 extends. The motor 20 is disposed closer to the end wall 13a of the motor housing 13 than the compression part 16 is. The compression part 16, the motor 20, and the inverter 17 are arranged in this order in the axial direction of the rotary shaft 15.

The electric compressor 10 includes a shaft support member 18. The shaft support member 18 is disposed between the compression part 16 and the motor 20. Accordingly, the shaft support member 18 serves as a partition between the motor 20 and the compression part 16. The shaft support member 18, and the end wall 13a and the peripheral wall 13b of the motor housing 13 define a motor chamber S2. Thus, the housing 11 has the motor chamber S2. The motor chamber S2 accommodates the motor 20. Refrigerant is introduced into the motor chamber S2 through the inlet port 13d.

The shaft support member 18 has an insertion hole 18h. The insertion hole 18h is formed at the center of the shaft support member 18. An axis of the insertion hole 18h coincides with the axis of the boss 13c. A first end portion of the rotary shaft 15 is inserted through the insertion hole 18h. A radial bearing 19a is disposed between the insertion hole 18h and the first end portion of the rotary shaft 15. The first end portion of the rotary shaft 15 is rotatably supported by the shaft support member 18 via the radial bearing 19a. A second end portion of the rotary shaft 15 is inserted into the boss 13c. A radial bearing 19b is disposed between the boss 13c and the second end portion of the rotary shaft 15. The second end portion of the rotary shaft 15 is rotatably supported by the boss 13c via the radial bearing 19b.

The compression part 16 includes a fixed scroll 16a and an orbiting scroll 16b. The fixed scroll 16a is fixed to the motor housing 13. The orbiting scroll 16b is disposed facing the fixed scroll 16a. The compression part 16 is driven by rotation of the rotary shaft 15. The compression part 16 is configured to compress refrigerant. A compression chamber S3 with variable volume is defined between the fixed scroll 16a and the orbiting scroll 16b. A discharge chamber S4 is defined between the fixed scroll 16a and the discharge housing 12. The refrigerant compressed with a change of the volume of the compression chamber S3 is discharged to the discharge chamber S4. The motor 20 rotates the rotary shaft 15. The rotation of the rotary shaft 15 drives the compression part 16. The compression part 16 compresses refrigerant with the rotation of the rotary shaft 15.

Basic Configuration of Motor

The motor 20 includes a rotor 21 and a stator 22. The stator 22 has a tubular shape. The rotor 21 is disposed inside the stator 22. The rotor 21 includes a rotor core 21a having a cylindrical shape, and a plurality of permanent magnets (not illustrated) embedded in the rotor core 21a. The rotor core 21a is fixed to the rotary shaft 15. The rotor core 21a is rotatable together with the rotary shaft 15.

The stator 22 includes a stator core 23. The stator core 23 is fixed to an inner peripheral surface of the peripheral wall 13b of the motor housing 13. Thus, the stator core 23 is fixed to the housing 11. For example, the stator core 23 is fitted in the inner peripheral surface of the peripheral wall 13b of the motor housing 13 by shrink fitting, so that the stator 22 is assembled to the housing 11. An axis of the stator core 23 coincides with the axis of the rotary shaft 15. That is, the axial direction of the stator core 23 coincides with the axial direction of the rotary shaft 15.

Figure 2:
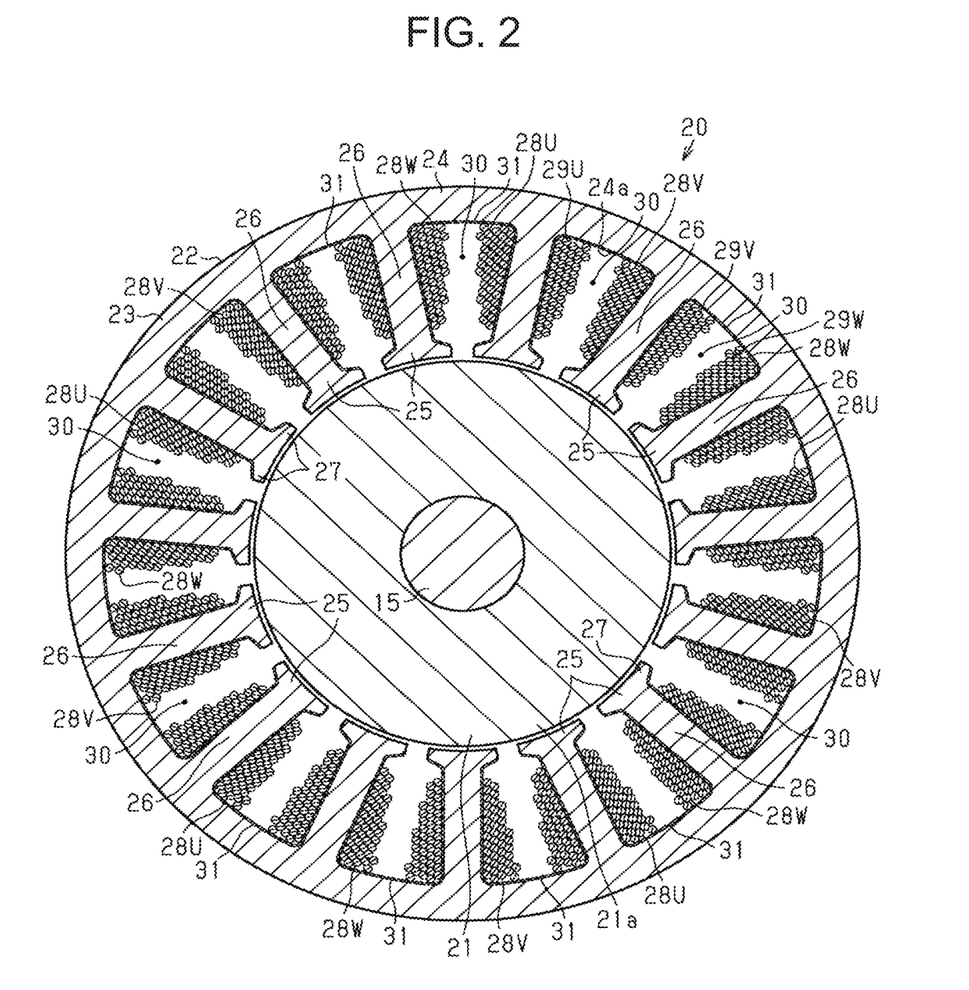
FIG. 2 is a cross-sectional view of a motor.
Figure 3:
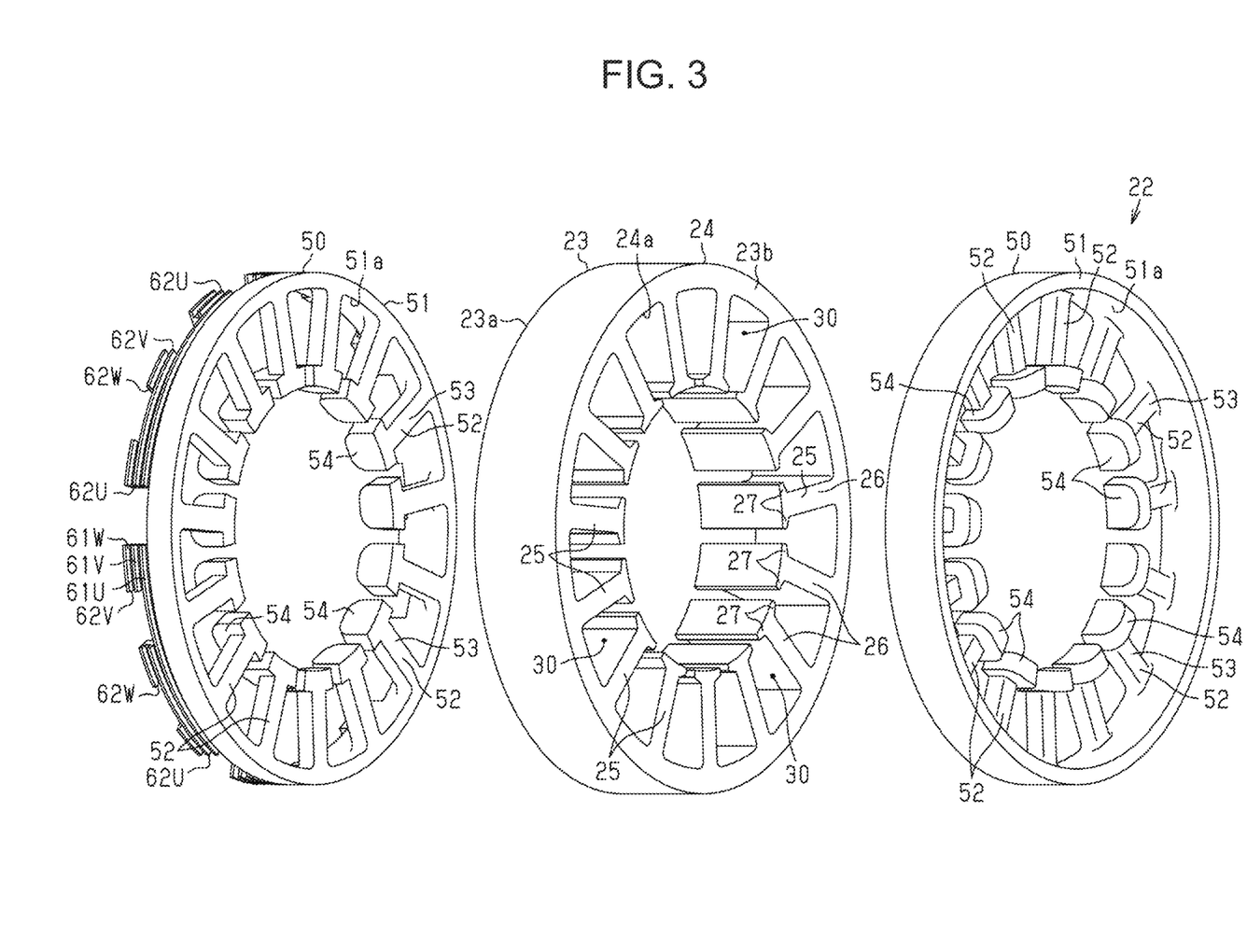
FIG. 3 is an exploded perspective view of a stator core and two insulators.

As illustrated in FIGS. 2 and 3, the stator core 23 includes a yoke 24 and a plurality of teeth 25. The yoke 24 has a cylindrical shape. The outer peripheral surface of the yoke 24 is fitted to the inner peripheral surface of the peripheral wall 13b of the motor housing 13, so that the stator core 23 is fixed to the motor housing 13.

The plurality of teeth 25 each extend inward from an inner peripheral surface 24a of the yoke 24 in a radial direction of the yoke 24. The teeth 25 are spaced from each other in a circumferential direction of the yoke 24. The teeth 25 are spaced from each other at regular intervals in the circumferential direction of the yoke 24. The circumferential direction of the yoke 24 corresponds to the circumferential direction of the stator core 23. The teeth 25 extend from the inner peripheral surface 24a of the yoke 24 toward the axis of the stator core 23. In the present embodiment, the stator core 23 has fifteen teeth 25. Although the number of the teeth 25 is not particularly limited, the number of the teeth 25 is a multiple of three.

As illustrated in FIG. 3, end surfaces of the yoke 24 on opposite ends thereof in the axial direction of the rotary shaft 15 each are a flat surface. End surfaces of each of the teeth 25 on opposite ends thereof in the axial direction of the rotary shaft 15 each are a flat surface. A length of the yoke 24 in the axial direction of the rotary shaft 15 is equal to a length of each of the teeth 25 in the axial direction of the rotary shaft 15. One of the end surfaces of the yoke 24 on one end thereof in the axial direction of the rotary shaft 15 is positioned on the same plane as the end surfaces of the teeth 25 on one ends thereof in the axial direction of the rotary shaft 15. The other of the end surfaces of the yoke 24 on the other end thereof in the axial direction of the rotary shaft 15 is positioned on the same plane as the end surfaces of the teeth 25 on the other ends thereof in the axial direction of the rotary shaft 15.

The one of the end surfaces of the yoke 24 on the one end in the axial direction of the rotary shaft 15 and the end surfaces of the teeth 25 on the one end in the axial direction of the rotary shaft 15 form a first core end surface 23a of the stator core 23 on one end thereof in the axial direction of the rotary shaft 15. The other of the end surfaces of the yoke 24 on the other end in the axial direction of the rotary shaft 15 and the end surfaces of the teeth 25 on the other end thereof in the axial direction of the rotary shaft 15 form a second core end surface 23b of the stator core 23 on the other end thereof in the axial direction of the rotary shaft 15. Accordingly, the stator core 23 has the first core end surface 23a and the second core end surface 23b. The first core end surface 23a is a core end surface of the stator core 23 positioned on the one end thereof in the axial direction of the rotary shaft 15. The second core end surface 23b is a core end surface of the stator core 23 positioned on the other end thereof in the axial direction of the rotary shaft 15.

As illustrated in FIG. 1, the stator core 23 is disposed in the motor housing 13 so that the first core end surface 23a faces the shaft support member 18 in the axial direction of the rotary shaft 15, and the second core end surface 23b faces the end wall 13a of the motor housing 13 in the axial direction of the rotary shaft 15.

As illustrated in FIGS. 2 and 3, the teeth 25 each have a tooth extension portion 26 and a tooth flange portion 27. The tooth extension portion 26 has a thin plate shape and extends from the inner peripheral surface 24a of the yoke 24. The tooth extension portion 26 extends from the first core end surface 23a to the second core end surface 23b of the stator core 23. The tooth flange portion 27 protrudes on opposite sides thereof in the circumferential direction of the stator core 23 from an end of the tooth extension portion 26 opposite from the yoke 24.

As illustrated FIG. 2, the stator 22 includes a plurality of U-phase coils 28U, a plurality of V-phase coils 28V, and a plurality of W-phase coils 28W each being a coil. Thus, the stator 22 includes a plurality of coils corresponding to the plurality of phases. The coils corresponding to the plurality of phases include the U-phase coils 28U, the V-phase coils 28V, and the W-phase coils 28W.

Winding Wire

The stator 22 includes a U-phase winding wire 29U that is wound around the stator core 23 by concentrated winding to form the plurality of U-phase coils 28U. The stator 22 includes a V-phase winding wire 29V that is wound around the stator core 23 by concentrated winding to form the plurality of V-phase coils 28V. The stator 22 includes a W-phase winding wire 29W that is wound around the stator core 23 by concentrated winding to form the plurality of W-phase coils 28W. Thus, the stator 22 includes a plurality of winding wires corresponding to the plurality of phases. The winding wires include the U-phase winding wire 29U, the V-phase winding wire 29V, and the W-phase winding wire 29W. The coils corresponding to the plurality of phases are formed by the concentrated winding of the winding wires corresponding to the plurality of phases on the stator core 23.

Figure 8:
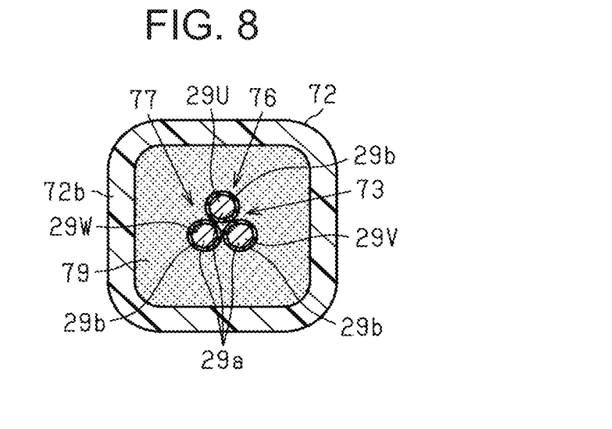
FIG. 8 is a cross-sectional view illustrating an accommodation portion and its interior.

As illustrated in FIG. 8, the U-phase winding wire 29U, the V-phase winding wire 29V, and the W-phase winding wire 29W each are made of, for example, a conductor wire 29a having an enamel coating 29b provided on an outer periphery of the conductor wire 29a. Therefore, each of the winding wires includes the conductor wire 29a and the enamel coating 29b provided on to the outer periphery of the conductor wire 29a.

A portion of each of the U-phase coils 28U, the V-phase coils 28V, and the W-phase coils 28W passes through each of slots 30, which are spaces formed between any adjacent teeth 25 in the circumferential direction of the stator core 23. It is noted that the portion of each of the U-phase coils 28U, V-phase coils 28V, and W-phase coils 28W passing through each of the slots 30 and the stator core 23 are insulated by a slot insulation sheet 31.

As illustrated in FIG. 1, the stator 22 includes first coil ends 32 and second coil ends 33. The first coil ends 32 each are a part of each of the U-phase coils 28U, the V-phase coils 28V, and the W-phase coils 28W, and projects out from the first core end surface 23a. The second coil ends 33 each are a part of each of the U-phase coils 28U, the V-phase coils 28V, and the W-phase coils 28W, and projects out from the second core end surface 23b. That is, the first coil ends 32 and the second coil ends 33 each are a part of the coils corresponding to the plurality of phases and project out from the core end surfaces.

Insulator

The stator 22 includes two insulators 50. The insulators 50 each have a tubular shape. The insulators 50 are made of, for example, a resin material. The insulators 50 insulate the U-phase coils 28U, the V-phase coils 28V, and the W-phase coils 28W from the stator core 23.

As illustrated in FIG. 3, the insulators 50 each include an insulator base 51, and a plurality of insulator teeth 52. The insulator base 51 has a cylindrical shape. The insulators 50 are disposed relative to the stator core 23 with axes of the insulator bases 51 coinciding with the axis of the yoke 24. One of the two insulators 50 is in contact with the first core end surface 23a of the stator core 23. The other of the two insulators 50 is in contact with the second core end surface 23b of the stator core 23. Accordingly, the insulators 50 are disposed relative to the core end surfaces of the stator core 23. An outer diameter of the insulator base 51 is smaller than that of the yoke 24. An inner diameter of the insulator base 51 is the same as that of the yoke 24.

The insulator teeth 52 each extend inward from an inner peripheral surface 51a of the insulator base 51 in a radial direction of the insulator base 51. The insulator teeth 52 are spaced from each other in a circumferential direction of the insulator base 51. The insulator teeth 52 are disposed at regular intervals in the circumferential direction of the insulator base 51. The insulator teeth 52 each extend from the inner peripheral surface 51a of the insulator base 51 in the axial direction of the insulator base 51. In the present embodiment, the insulators 50 each have fifteen insulator teeth 52. The number of insulator teeth 52 is the same as the number of the teeth 25 of the stator core 23.

The insulator teeth 52 each have an insulator extension portion 53, and insulator flange portions 54. The insulator extension portion 53 has a columnar shape extending from the inner peripheral surface 51a of the insulator base 51. A width of the insulator extension portion 53 in the circumferential direction of the insulator base 51 is the same as that of the tooth extension portion 26 in the circumferential direction of the stator core 23. The insulator extension portion 53 is in contact with its corresponding one of the teeth 25. The insulator flange portion 54 protrudes along the insulator base 51 from an end of the insulator extension portion 53 opposite from the insulator base 51.

Of the two insulators 50, one of the insulators 50 disposed relative to the first core end surface 23a of the stator core 23 has a U-phase guide groove 61U, a V-phase guide groove 61V, and a W-phase guide groove 61W. The U-phase guide groove 61U, the V-phase guide groove 61V, and the W-phase guide groove 61W are arranged side by side in the axial direction of the one of the insulators 50. The U-phase guide groove 61U, the V-phase guide groove 61V, and the W-phase guide groove 61W are formed in an outer peripheral surface of the insulator base 51. That is, the U-phase guide groove 61U, the V-phase guide groove 61V, and the W-phase guide groove 61W are formed in an outer peripheral surface of the one of the insulators 50. The U-phase guide groove 61U, the V-phase guide groove 61V, and the W-phase guide groove 61W extend in the circumferential direction of the one of the insulators 50.

Of the two insulators 50, the one of the insulators 50 disposed relative to the first core end surface 23a of the stator core 23 has five U-phase through grooves 62U, five V-phase through grooves 62V, and five W-phase through grooves 62W. Each of the U-phase through grooves 62U, the V-phase through grooves 62V, and the W-phase through grooves 62W extends through the one of the insulators 50 in the radial direction.

Coil

Figure 4:
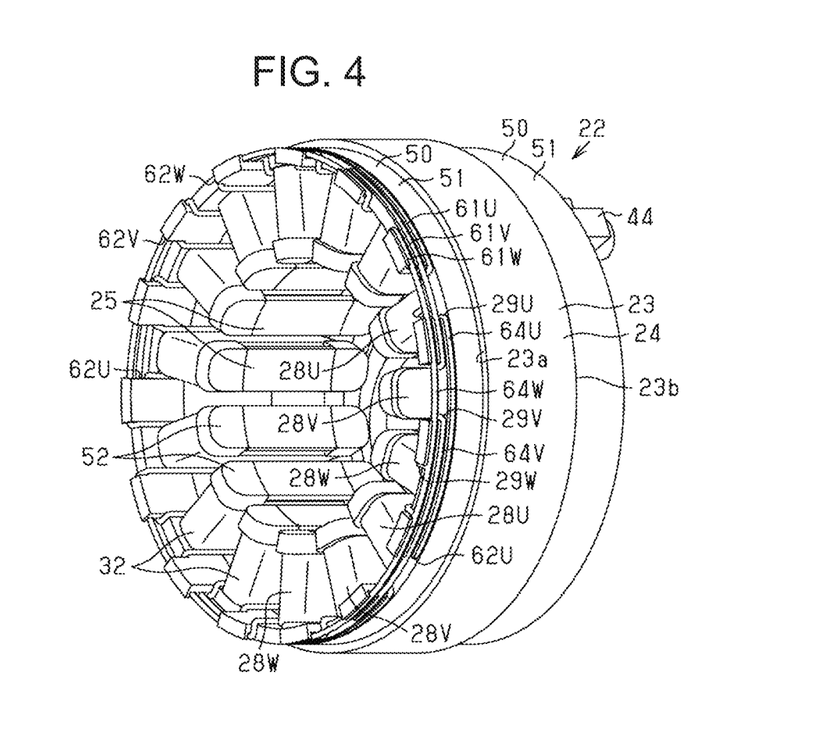
FIG. 4 is a perspective view of a stator before a cover is mounted to the insulator.

As illustrated in FIG. 4, the U-phase coils 28U, the V-phase coils 28V, and the W-phase coils 28W are formed by series winding. In series winding, firstly, the U-phase winding wire 29U, the V-phase winding wire 29V, the W-phase winding wire 29W are wound around their associated tooth extension portions 26 and the insulator extension portions 53 of the insulators 50. Then, the U-phase winding wire 29U, the V-phase winding wire 29V, the W-phase winding wire 29W are wound around every third tooth extension portions 26 and the insulator extension portions 53 of the insulators 50 in the circumferential direction of the stator core 23 in turn by concentrated winding. Thus, the U-phase coils 28U, the V-phase coils 28V, and the W-phase coils 28W are arranged every other two coils in the circumferential direction of the stator core 23. In the present embodiment, five U-phase coils 28U, five V-phase coils 28V, and five W-phase coils 28W are arranged. The U-phase coils 28U, the V-phase coils 28V, and the W-phase coils 28W are disposed so that different phases are next to each other, in the slots 30, in the circumferential direction of the stator core 23.

Of the two insulators 50, the one of the insulators 50 disposed relative to the first core end surface 23a of the stator core 23 insulates the U-phase coils 28U, the V-phase coils 28V, and the W-phase coils 28W from the first core end surface 23a. Of the two insulators 50, the other of the insulators 50 disposed relative to the second core end surface 23b of the stator core 23 insulates the U-phase coils 28U, the V-phase coils 28V, and the W-phase coils 28W from the second core end surface 23b.

The U-phase winding wire 29U includes U-phase crossovers 64U connecting the U-phase coils 28U to each other in the circumferential direction of the stator core 23. The U-phase crossovers 64U are pulled out from the first coil ends 32 of the U-phase coils 28U and guided to the U-phase guide groove 61U via the U-phase through grooves 62U. The V-phase winding wire 29V includes the V-phase crossovers 64V connecting the V-phase coils 28V to each other in the circumferential direction of the stator core 23. The V-phase crossovers 64V are pulled out from the first coil ends 32 of the V-phase coils 28V and guided to the V-phase guide groove 61V via the V-phase through grooves 62V. The W-phase winding wire 29W includes the W-phase crossovers 64W connecting the W-phase coils 28W to each other in the circumferential direction of the stator core 23. The W-phase crossovers 64W are pulled out from the first coil ends 32 of the W-phase coils 28W and guided to the W-phase guide groove 61W via the W-phase through grooves 62W.

Cover

Figure 5:
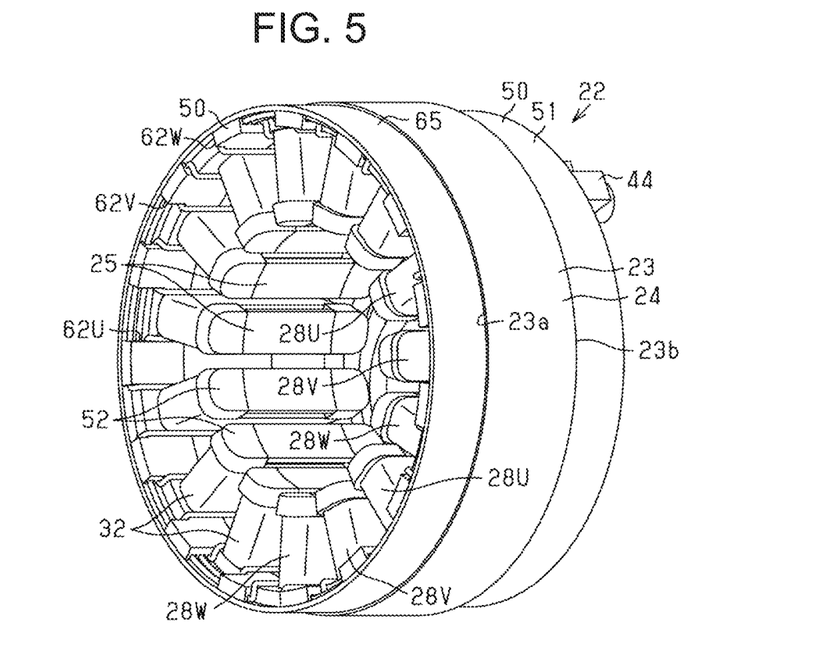
FIG. 5 is a perspective view of the stator in which the cover is mounted to the insulator.

As illustrated in FIG. 5, the electric compressor 10 includes a cover 65. The cover 65 has a cylindrical shape. The cover 65 has electrical insulation properties. The cover 65 is made of a resin material, for example. An inner diameter of the cover 65 is larger than the outer diameter of the insulator base 51. The cover 65 is attached to the one of the insulators 50, of the two insulators 50, disposed relative the first core end surface 23a of the stator core 23 so as to surround the outer peripheral surface of the one of the insulators 50.

As illustrated in FIG. 1, the cover 65 is interposed between the U-phase crossovers 64U, the V-phase crossovers 64V, and the W-phase crossovers 64W, and the peripheral wall 13b of the motor housing 13. The cover 65 secures insulation between the U-phase crossovers 64U, the V-phase crossovers 64V, and the W-phase crossovers 64W, and the motor housing 13.

Cover Member

Figure 6:
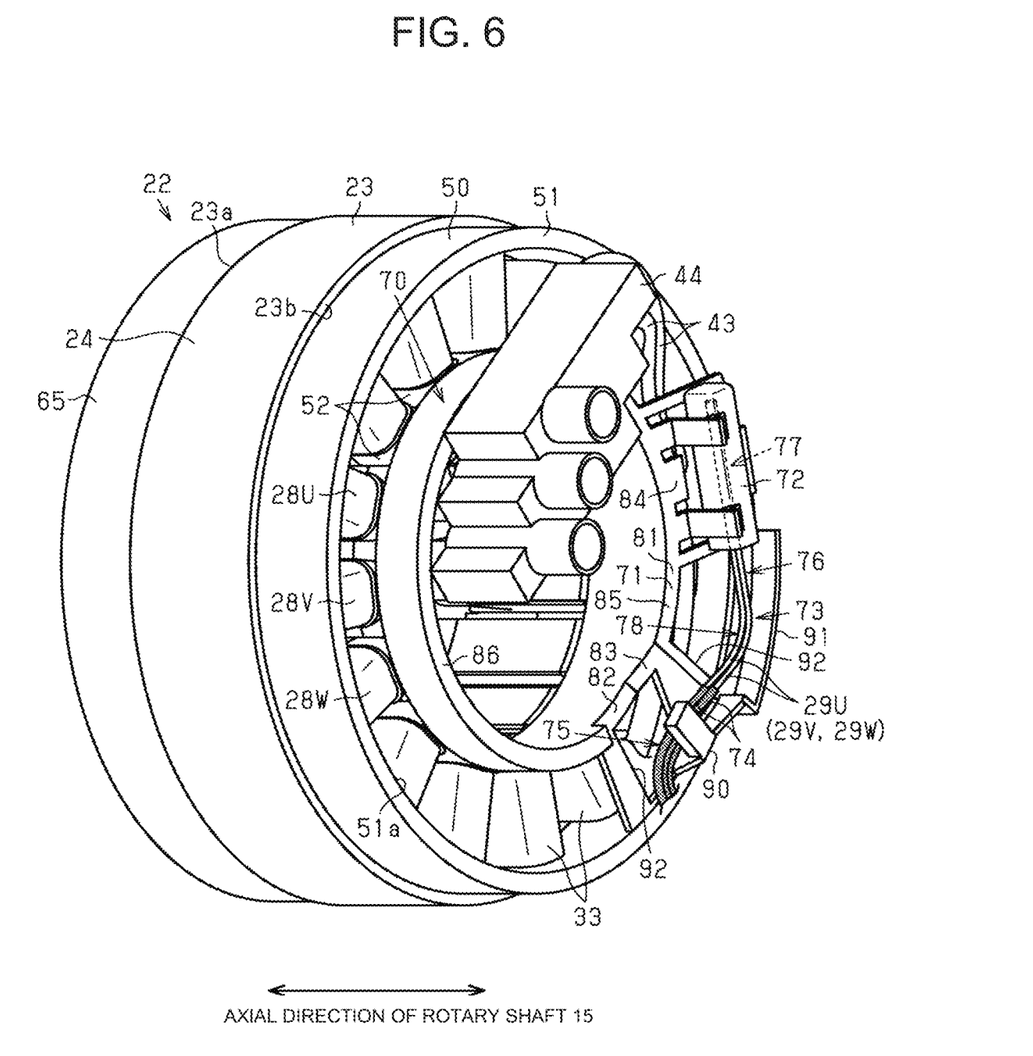
FIG. 6 is a perspective view of the stator.

As illustrated in FIG. 6, the stator 22 includes a cover member 70. The cover member 70 has a substantially cylindrical shape. The cover member 70 has electrical insulation properties. The cover member 70 is made of a resin material, for example. The cover member 70 is disposed on a side of the second coil ends opposite from the second core end surface 23b in the axial direction of the rotary shaft 15. The cover member 70 is attached to, of the two insulators 50, the other of the insulators 50 disposed relative to the second core end surface 23b of the stator core 23. It is noted that a configuration for attaching the cover member 70 to the other of the insulators 50 is not particularly limited. For example, the cover member 70 is attached to the other of the insulators 50 with a protrusion protruding from the cover member 70 fitted to a recess formed in the other of the insulators 50.

Figure 7:
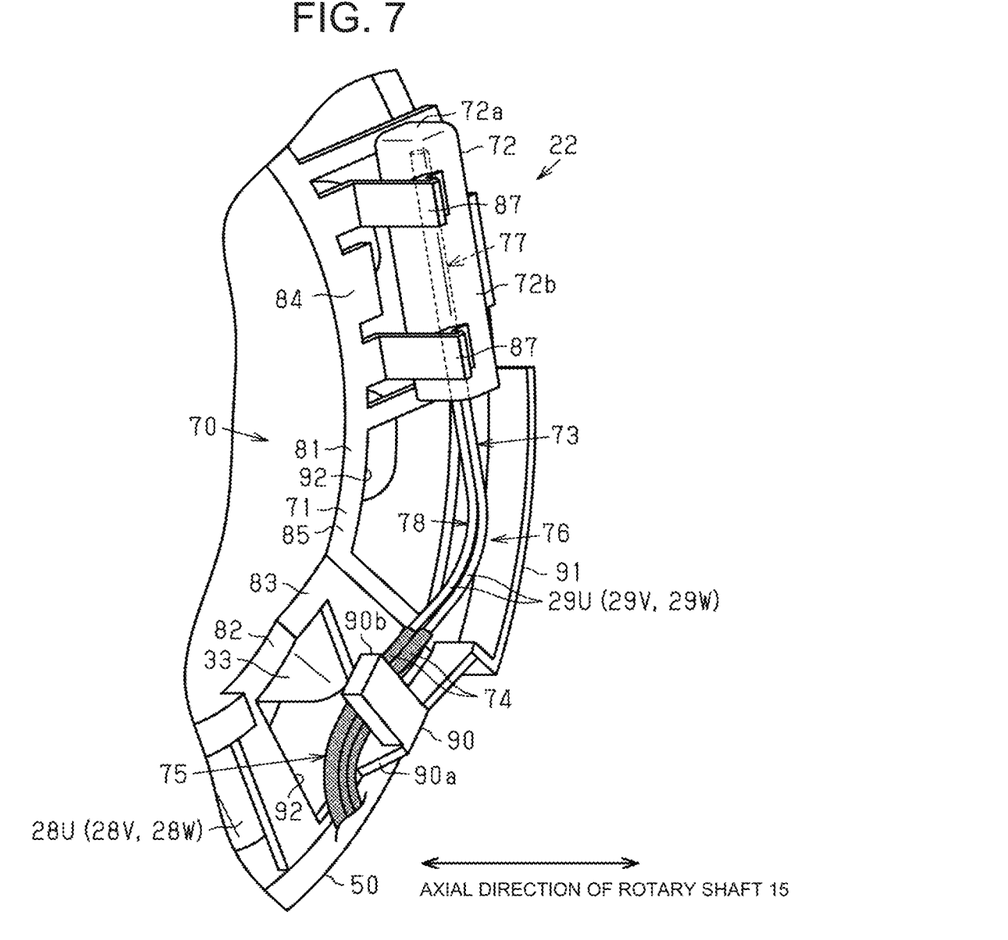
FIG. 7 is a partially enlarged perspective view of the stator.

As illustrated in FIGS. 6 and 7, the cover member 70 has a cover end surface 71. The cover end surface 71 is positioned opposite from the second coil ends 33 in the axial direction of the rotary shaft 15. The cover end surface 71 has a substantially annular shape. An accommodation portion 72 having electrical insulation properties is formed in the cover end surface 71. The accommodation portion 72 has, for example, a square tubular shape. As illustrated in FIG. 7, the accommodation portion 72 has an end wall 72a and a peripheral wall 72b. The peripheral wall 72b extends from the outer periphery of the end wall 72a in a square tubular shape.

First Lead

The stator 22 includes three first leads 73. The first leads 73 are portions of the U-phase winding wire 29U, the V-phase winding wire 29V, and the W-phase winding wire 29W, respectively. The first leads 73 are pulled out from the second coil ends 33 of the U-phase coils 28U, the V-phase coils 28V, and the W-phase coils 28W, respectively. Thus, the three first leads 73 correspond to the plurality of phases.

The first leads 73 corresponding to the plurality of phases are a portion of the U-phase winding wire 29U, a portion of the V-phase winding wire 29V, and a portion of the W-phase winding wire 29W, respectively. Thus, as with the U-phase winding wire 29U, the V-phase winding wire 29V, and the W-phase winding wire 29W, the first leads 73 each are made of the conductor wire 29a having the enamel coating 29b provided on the outer periphery of the conductor wire 29a. The first leads 73 corresponding to the plurality of phases each further include a covered portion 75 in which the outer periphery of the enamel coating 29b is covered with an insulation member 74 made of a tubular resin, and a non-covered portion 76 in which the insulation member 74 is not provided. It is noted that the insulation member 74 is shown by dot-hatching in FIGS. 6 and 7. Accordingly, the winding wires and the first leads 73 each being a part of winding wires each are made of, for example, the conductor wire 29a having the enamel coating 29b coated on the outer periphery of the conductor wire 29a, and the insulation members 74 cover the outer peripheries of the first leads 73.

As shown in FIG. 7, the ends of the first leads 73 corresponding to the plurality of phases are the non-covered portions 76 where the insulation members 74 are not provided, and are electrically connected to each other to form a neutral connection portion 77 forming the neutral point. Therefore, the stator 22 includes the neutral connection portion 77 where the ends of the first leads 73 are electrically connected to from the neutral point. The non-covered portions 76 each include the neutral connection portion 77.

The neutral connection portion 77 is accommodated in the accommodation portion 72. Thus, the accommodation portion 72 accommodates the neutral connection portion 77. The neutral connection portion 77 is inserted into the accommodation portion 72 through an opening of the peripheral wall 72b of the accommodation portion 72. The non-covered portions 76 each have an extension portion 78 continuous with the neutral connection portion 77 and extending out from the accommodation portion 72 by a predetermined length. The extension portion 78 extends out from the accommodation portion 72 through the opening of the peripheral wall 72b of the accommodation portion 72. In this way, the first leads 73 corresponding to the plurality of phases have the non-covered portions 76, respectively, which are not provided with the insulation members 74 and include the neutral connection portion 77 and the extension portions 78 continuous with the neutral connection portion 77 and extending out from the accommodation portion 72 by the predetermined length. The covered portion 75 is continuous with a portion of the extension portion 78 opposite from the neutral connection portion 77.

As illustrated in FIG. 8, the accommodation portion 72 is filled with resin 79. In FIG. 8, the resin 79 is shown by dot-hatching. The accommodation portion 72 is sealed with the resin 79. Specifically, with the neutral connection portion 77 inserted into the accommodation portion 72, the resin 79 is poured into the accommodation portion 72 and hardened, thereby sealing the inside of the accommodation portion 72 with the resin 79. Accordingly, insulation of the neutral connection portion 77 is secured.

First Surface and Second Surface

As illustrated in FIGS. 6 and 7, the cover end surface 71 has a first surface 81 and a second surface 82. The first surface 81 is positioned farther from the second coil ends 33 than the second surface 82 is. The second surface 82 is a different surface from the first surface 81. The first surface 81 and the second surface 82 are flat surfaces and extend in parallel with each other. The cover end surface 71 includes a connection surface 83. The connection surface 83 connects the first surface 81 with the second surface 82. The connection surface 83 extends obliquely to the first surface 81 and the second surface 82.

The first surface 81 has a placement surface 84 on which the accommodation portion 72 is placed, and an extension surface 85 on which the extension portion 78 is placed. The extension surface 85 is positioned closer to the connection surface 83 than the placement surface 84 is. The cover end surface 71 also has a circumferential surface 86 that connects an end of the second surface 82 opposite from the connection surface 83 with an end of the first surface 81 opposite from the connection surface 83. The circumferential surface 86 extends in the circumferential direction of the cover end surface 71. The circumferential surface 86 is located on the same plane as the first surface 81.

As illustrated in FIG. 7, a plurality of engagement pieces 87 are provided on the placement surface 84. Each of the engagement pieces 87 stands up from the placement surface 84. A tip of each of the engagement pieces 87 has a hook-shape. The engagement pieces 87 are configured to be engaged with the accommodation portion 72. With the accommodation portion 72 engaged with the engagement pieces 87, the accommodation portion 72 is attached to the cover end surface 71 in a state where the accommodation portion 72 is placed on the placement surface 84. Thus, the accommodation portion 72 and the cover member 70 are separately provided parts. The extension portion 78 of each of the first leads 73 corresponding to the plurality of phases passes over the extension surface 85. In this way, the accommodation portion 72 and the extension portion 78 are disposed on the first surface 81.

The covered portions 75 of the first leads 73 corresponding to the plurality of phases pass over the second surface 82. Thus, the covered portions 75 are placed on the second surface 82. In addition, the covered portions 75 of the first leads 73 corresponding to the plurality of phases partially extend along the connection surface 83.

Restriction Portion

The cover member 70 has a restriction portion 90. The restriction portion 90 has a standing-up piece 90a that stands up from the outer peripheral edge of the second surface 82, and a restriction piece 90b that is bent at a tip of the standing-up piece 90a and extends so as to overlap with the second surface 82 in the axial direction of the rotary shaft 15. The covered portions 75 pass through a space between the second surface 82 and the restriction piece 90b. The restriction piece 90b restricts a movement of the covered portions 75 in a direction away from the second surface 82. Thus, the restriction portion 90 restricts a movement of the covered portions 75 in the direction away from the second surface 82.

Insulation Wall

The cover member 70 has an insulation wall 91. The insulation wall 91 has a thin plate shape that stands up from a portion of the cover member 70, which extends from the outer peripheral edge of the extension surface 85 to the outer peripheral edge of the second surface 82 across the outer peripheral edge of the connection surface 83. The insulation wall 91 covers the extension portion 78 from an outer side thereof in the radial direction of the rotary shaft 15.

Through Hole

Through holes 92 are formed in the first surface 81 and the second surface 82, respectively. At least the first surface 81 has the through hole 92. The through holes 92 extend through the cover member 70. A first end of each of the through holes 92 is opened at the cover end surface 71. A second end of each of the through holes 92 is opened at the end surface of the cover member 70 on the second coil ends 33 side. Refrigerant drawn into the motor chamber S2 flows to the second coil ends 33 through the through holes 92.

Hermetic Terminal

As illustrated in FIG. 1, the electric compressor 10 includes a hermetic terminal 40. The hermetic terminal 40 has three conductive members 41 corresponding to the U-phase coils 28U, the V-phase coils 28V, and the W-phase coils 28W. Thus, the electric compressor 10 includes the conductive members 41. It is noted that only one of the conductive members 41 is illustrated in FIG. 1. The conductive members 41 each are a cylindrical metal terminal extending linearly. A first end of each of the conductive members 41 is electrically connected to the inverter 17 in the inverter chamber S1. A second end of each of the conductive members 41 projects into the motor housing 13 from the inverter chamber S1 through the hole 13h. The hermetic terminal 40 includes a support plate 42. The support plate 42 supports the three conductive members 41 with the conductive members 41 insulated from each other. The support plate 42 is fixed to the outer surface of the end wall 13a of the motor housing 13 around the hole 13h in the inverter chamber S1.

The stator 22 includes second leads 43. The second leads 43 are drawn out from the motor 20. The second leads 43 are drawn out from the second coil ends 33 of the U-phase coils 28U, the V-phase coils 28V, and the W-phase coils 28W. That is, the second leads 43 are drawn out from the coil ends corresponding to the plurality of phases. Accordingly, three second leads 43 are drawn out from the motor 20. It is noted that only one of the second leads 43 is illustrated in FIG. 1.

The stator 22 includes a cluster block 44. The cluster block 44 accommodates three connection terminals 45 corresponding to the U-phase coils 28U, the V-phase coils 28V, and the W-phase coils 28W. The cluster block 44 has electrical insulation properties. The cluster block 44 is made of a resin material, for example. The connection terminals 45 electrically connect the conductive members 41 with the second leads 43.

Electric power from the inverter 17 is supplied to the motor 20 via the conductive members 41, the connection terminals 45, and the second leads 43 to drive the motor 20. That is, the inverter 17 drives the motor 20.

As illustrated in FIG. 6, the cluster block 44 is disposed relative to the cover member 70 at a position overlapping with the circumferential surface 86 of the cover end surface 71 in the axial direction of the rotary shaft 15. Therefore, the cluster block 44 is disposed relative to the cover member 70 at a position not overlapping with the accommodation portion 72 in the axial direction of the rotary shaft 15.

Operation of Embodiment

The following will describe the operation according to the present embodiment.

Refrigerant introduced into the motor chamber S2 flows to the second coil ends 33 through the through holes 92. Therefore, the U-phase coils 28U, the V-phase coils 28V, and the W-phase coils 28W are efficiently cooled by the refrigerant. In addition, in the cover end surface 71, the first surface 81 is positioned farther from the second coil ends 33 than the second surface 82 is. This allows the insulation distance between the extension portion 78 disposed on the first surface 81 and the second coil ends 33 via the through holes 92 to be lengthened. This configuration suppresses poor insulation between the extension portions 78 and the second coil ends 33 via the through holes 92. In addition, the covered portions 75 disposed on the second surface 82 are portions of the first leads 73 corresponding to the plurality of phases, which are covered with the insulation members 74. Therefore, even if the second surface 82 is brought closer to the second coil ends 33 than the first surface 81 is, poor insulation between the covered portion 75 and the second coil ends 33 via the through holes 92 does not occur. Accordingly, insulation between the first leads 73 and the second coil ends 33 is secured.

Advantageous Effect

The aforementioned embodiment provides following advantageous effects.

(1) Since refrigerant introduced into the motor chamber S2 flows to the second coil ends 33 through the through holes 92, the U-phase coils 28U, V-phase coils 28V, and W-phase coils 28W are efficiently cooled by the refrigerant. In addition, in the cover end surface 71, the first surface 81 is positioned farther from the second coil ends 33 than the second surface 82 is. This allows the insulation distance between the extension portions 78 disposed on the first surface 81 and the second coil ends 33 via the through holes 92 to be lengthened. As a result, poor insulation between the extension portions 78 and the second coil ends 33 via the through holes 92 may be suppressed. By effectively utilizing a space produced by bringing the second surface 82 closer to the second coil ends 33 than the first surface 81 is, the electric compressor 10 may be downsized in the axial direction of the rotary shaft 15. Accordingly, the configuration of the present embodiment may secure insulation between the first leads 73 and the second coil ends 33, and cool the U-phase coils 28U, the V-phase coils 28V, and the W-phase coils 28W while downsizing the electric compressor 10 in the axial direction of the rotary shaft 15.

(2) The cluster block 44 is disposed relative to the cover member 70 at a position not overlapping with the accommodation portion 72 in the axial direction of the rotary shaft 15. This configuration allows the cluster block 44 to be disposed relative to the second coil ends 33 as close as possible, as compared with a case in which the cluster block 44 is disposed relative to the cover member 70 at a position overlapping with the accommodation portion 72 in the axial direction of the rotary shaft 15. Therefore, the electric compressor 10 may be further downsized in the axial direction of the rotary shaft 15.

(3) The cover member 70 has the insulation wall 91 that covers the extension portions 78 of the first leads 73 from the outside in the radial direction of the rotary shaft 15. According to this configuration, for example, insulation between the extension portion 78 and the housing 11 may be secured by the insulation wall 91. Since the cover member 70 has the insulation wall 91, insulation of the first leads 73 may be further secured.

(4) The connection surface 83 extends obliquely to the first surface 81 and the second surface 82. Therefore, the first leads 73 may extend without excessively bending portions of the first leads 73 extending between the first surface 81 and the second surface 82. Therefore, load applied to the first leads 73 may be suppressed, so that the durability of the first leads 73 may be increased.

(5) The cover member 70 has the restriction portion 90 that restricts the movement of the covered portions 75 of the first leads 73 in the direction away from the second surface 82. According to this, the covered portions 75 disposed on the second surface 82 may be positioned relative to the second surface 82 as close as possible by the restriction portion 90. Therefore, the covered portions 75 on the second surface 82 may be positioned relative to the second coil ends 33 as close as possible. Therefore, the electric compressor 10 may be further downsized in the axial direction of the rotary shaft 15.

(6) With the accommodation portion 72 engaged with the engagement pieces 87, the accommodation portion 72 is attached to the cover end surface 71 in a state where the accommodation portion 72 is placed on the placement surface 84. Therefore, for example, a process of tying the neutral connection portion 77 to the second coil ends 33 with a fixing thread is not necessary, so that the work process may be simplified.

(7) Since the accommodation portion 72 is provided on the cover end surface 71, the electric compressor 10 may be downsized in the radial direction of the rotary shaft 15, as compared to a case in which the accommodation portion 72 is provided on the outer peripheral side of the other of the insulators 50, for example.

(8) For example, if the portions of the first leads 73 positioned inside the accommodation portion 72 are covered with the insulation members 74, the resin 79 poured into the accommodation portion 72 may have difficulty sticking to the insulation members 74, which may make sealing the inside of the accommodation portion 72 with the resin 79 difficult. In contrast, in the present embodiment, the insulation members 74 are not provided to the portions of the first leads 73 extending out from the accommodation portion 72 by the predetermined length, in addition to the portions of the first leads 73 positioned inside the accommodation portion 72. In this way, the first leads 73 corresponding to the plurality of phases each have the non-covered portion 76 which is not provided with the insulation member 74 and includes the neutral connection portion 77 and the extension portion 78 continuous with the neutral connection portion 77 and extending out from the accommodation portion 72 by the predetermined length. According to this, even if there is an error in design of the dimension of the accommodation portion 72, the portions of the first leads 73 positioned in the accommodation portion 72 may be reliably inserted as the non-covered portion 76 where the insulation member 74 is provided. As a result, the inside of the accommodation portion 72 may be reliably sealed with the resin 79.

Modification

The above embodiment may be modified as below. The embodiment and the following modifications may be combined with each other within a technically consistent range.

In the embodiment, the position of the cluster block 44 relative to the cover member 70 is not particularly limited.

In the embodiment, the cover member 70 does not have to include the insulation wall 91.

In the embodiment, the connection surface 83 connecting the first surface 81 and the second surface 82 does not have to extend obliquely. The connection surface 83 may be, for example, a step surface extending in a direction perpendicular to the first surface 81 and the second surface 82.

In the embodiment, the cover member 70 does not have to include the restriction portion 90.

In the embodiment, the accommodation portion 72 may be integrally formed with the cover member 70.

In the embodiment, the circumferential surface 86 of the cover end surface 71 does not have to be positioned on the same plane as the first surface 81. For example, the circumferential surface 86 may be located on the same plane as the second surface 82.

In the embodiment, portions of the covered portions 75 may be disposed on the extension surface 85.

In the embodiment, the second surface 82 does not have to include the through holes 92.

In the embodiment, the cover member 70 may be attached to the stator core 23, instead of the other of the insulators 50.

In the embodiment, the cover member 70 does not have to have a substantially cylindrical shape. For example, the cover member 70 may have a shape in which a portion of the cover member 70 forming the circumferential surface 86 is removed.

In the embodiment, the compression part 16 is not limited to a scroll compression part, but may be a piston or vane compression part.

In the embodiment, the electric compressor 10 is used for the vehicle air conditioner, but not limited thereto. For example, the electric compressor 10 may be mounted to a fuel cell vehicle, and may be configured to cause the compression part 16 to compress air, as a fluid supplied to a fuel cell.

ADDITIONAL NOTES

The above embodiment includes configurations described in the following.

Additional Note 1

An electric compressor comprising:
a rotary shaft;
a compression part configured to compress fluid with rotation of the rotary shaft;
a motor configured to rotate the rotary shaft; and
a housing having a motor chamber in which the motor is accommodated and into which the fluid is introduced,
the motor including a stator,
the stator including:
  a stator core fixed to the housing;
  coils corresponding to a plurality of phases, the coils being formed by concentrated winding of winding wires corresponding to the plurality of phases on the stator core;
  an insulator disposed relative to a core end surface of the stator core in an axial direction of the rotary shaft, and providing insulation between the coils and the core end surface;
  coil ends of the coils corresponding to the plurality of phases, the coil ends projecting out from the core end surface;
  first leads being portions of the winding wires corresponding to the plurality of phases and drawn out from the coil ends corresponding to the plurality of phases, respectively;
  a neutral connection portion in which ends of the first leads corresponding to the plurality of phases are electrically connected to form a neutral point; and
  a cover member disposed on a side of the coil ends opposite from the core end surface in the axial direction, the cover member having electrical insulation properties,
the winding wires each having a conductor wire and a coating provided on an outer periphery of the conductor wire,
the cover member having a cover end surface opposite from the coil ends in the axial direction,
the cover end surface having an accommodation portion in which the neutral connection portion is accommodated, the accommodation portion having electrical insulation properties,
the first leads corresponding to the plurality of phases each include:
  a covered portion in which an outer periphery of the coating is covered with an insulation member; and
  a non-covered portion which is not provided with the insulation member and includes the neutral connection portion and an extension portion continuous with the neutral connection portion extending out from the accommodation portion by a predetermined length,
the cover end surface includes:
  a first surface on which the accommodation portion and the extension portion are placed, and
  a second surface that is a surface different from the first surface,
at least the first surface having a through hole through which the fluid introduced into the motor chamber flows to the coil ends, wherein
the first surface is positioned farther from the coil ends than the second surface is.

Additional Note 2

The electric compressor according to [Additional note 1], further comprising:
an inverter configured to drive the motor; and
a conductive member electrically connected to the inverter, wherein
the stator includes:
  second leads drawn out from the coil ends corresponding to the plurality of phases; and
  a cluster block in which a connection terminal electrically connecting the conductive member with the second leads is accommodated, the cluster block having electrical insulation properties, and
the cluster block is disposed relative to the cover member at a position not overlapping with the accommodation portion in the axial direction.

Additional Note 3

The electric compressor according to [Additional note 1] or [Additional note 2], wherein
the cover member has an insulation wall that covers the extension portion from an outer side of the extension portion in a radial direction of the rotary shaft.

Additional Note 4

The electric compressor according to any one of [Additional note 1] to [Additional note 3], wherein
the first surface and the second surface are flat surfaces extending in parallel to each other,
the cover end surface has a connection surface connecting the first surface with the second surface, and
the connection surface extends obliquely to the first surface and the second surface.

Additional Note 5

The electric compressor according to any one of [Additional note 1] to [Additional note 4], wherein
the cover member has a restriction portion that restricts movement of the covered portion in a direction away from the second surface.

What is claimed is:
1. An electric compressor comprising:
a rotary shaft;
a compression part configured to compress fluid with rotation of the rotary shaft;
a motor configured to rotate the rotary shaft; and
a housing having a motor chamber in which the motor is accommodated and into which the fluid is introduced,
the motor including a stator,
the stator including:
   a stator core fixed to the housing;
   coils corresponding to a plurality of phases, the coils being formed by concentrated winding of winding wires corresponding to the plurality of phases on the stator core;
   an insulator disposed relative to a core end surface of the stator core in an axial direction of the rotary shaft, and providing insulation between the coils and the core end surface;
   coil ends of the coils corresponding to the plurality of phases, the coil ends projecting out from the core end surface;
   first leads being portions of the winding wires corresponding to the plurality of phases and drawn out from the coil ends corresponding to the plurality of phases, respectively;
   a neutral connection portion in which ends of the first leads corresponding to the plurality of phases are electrically connected to form a neutral point; and
   a cover member disposed on a side of the coil ends opposite from the core end surface in the axial direction, the cover member having electrical insulation properties,
the winding wires each having a conductor wire and a coating provided on an outer periphery of the conductor wire,
the cover member having a cover end surface opposite from the coil ends in the axial direction,
the cover end surface having an accommodation portion in which the neutral connection portion is accommodated, the accommodation portion having electrical insulation properties,
the first leads corresponding to the plurality of phases each including:
   a covered portion in which an outer periphery of the coating is covered with an insulation member; and
   a non-covered portion which is not provided with the insulation member and includes the neutral connection portion and an extension portion continuous with the neutral connection portion extending out from the accommodation portion by a predetermined length,
the cover end surface including:
   a first surface on which the accommodation portion and the extension portion are placed, and
   a second surface that is a surface different from the first surface,
at least the first surface having a through hole through which the fluid introduced into the motor chamber flows to the coil ends, wherein
the first surface is positioned farther from the coil ends than the second surface is.

2. The electric compressor according to claim 1, further comprising:
an inverter configured to drive the motor; and
a conductive member electrically connected to the inverter, wherein
the stator includes:
   second leads drawn out from the coil ends corresponding to the plurality of phases; and
   a cluster block in which a connection terminal electrically connecting the conductive member with the second leads is accommodated, the cluster block having electrical insulation properties, and
the cluster block is disposed relative to the cover member at a position not overlapping with the accommodation portion in the axial direction.

3. The electric compressor according to claim 1, wherein the cover member has an insulation wall that covers the extension portion from an outer side of the extension portion in a radial direction of the rotary shaft.

4. The electric compressor according to claim 1, wherein the first surface and the second surface are flat surfaces extending in parallel to each other,
the cover end surface has a connection surface connecting the first surface with the second surface, and
the connection surface extends obliquely to the first surface and the second surface.

5. The electric compressor according to claim 1, wherein the cover member has a restriction portion that restricts movement of the covered portion in a direction away from the second surface.

* * * * *